US012186924B2

(12) United States Patent
Li

(10) Patent No.: US 12,186,924 B2
(45) Date of Patent: Jan. 7, 2025

(54) SHAVER HEAD ASSEMBLY AND SHAVER

(71) Applicant: ZHEJIANG ZHIBO ELECTRICAL APPLIANCE TECHNOLOGY CO., LTD., Haining (CN)

(72) Inventor: Gaoyan Li, Haining (CN)

(73) Assignee: ZHEJIANG ZHIBO ELECTRICAL APPLIANCE TECHNOLOGY CO., LTD., Haining (CN)

( * ) Notice: Subject to any disclaimer, the term of this patent is extended or adjusted under 35 U.S.C. 154(b) by 0 days.

(21) Appl. No.: 17/770,405

(22) PCT Filed: Oct. 12, 2021

(86) PCT No.: PCT/CN2021/123153

§ 371 (c)(1),
(2) Date: Apr. 20, 2022

(87) PCT Pub. No.: WO2022/222387

PCT Pub. Date: Oct. 27, 2022

(65) Prior Publication Data

US 2024/0139979 A1 May 2, 2024

(30) Foreign Application Priority Data

Apr. 23, 2021 (CN) ......................... 202110440325.1
Apr. 23, 2021 (CN) ......................... 202120844151.0

(51) Int. Cl.
*B26B 19/14* (2006.01)
*B26B 19/38* (2006.01)

(52) U.S. Cl.
CPC ........ *B26B 19/143* (2013.01); *B26B 19/3853* (2013.01)

(58) Field of Classification Search
CPC ..... B26B 19/14; B26B 19/141; B26B 19/143; B26B 19/145; B26B 19/42; B26B 19/3853
(Continued)

(56) References Cited

U.S. PATENT DOCUMENTS 2,824,367 A * 2/1958 McWilliams ........... B26B 19/14 30/34.2
4,630,370 A * 12/1986 Hamada ................ B26B 19/143 30/346.51
(Continued)

FOREIGN PATENT DOCUMENTS

CN 103522312 A * 1/2014 ........... B26B 19/141
CN 207807806 U 12/2017
(Continued)

OTHER PUBLICATIONS

CN-109571554 English Translation; Apr. 5, 2019 Wu R, B26B19/14.*
CN-112140149A English Translation; Liu Y; Dec. 29, 2020; B26B19/141.*

*Primary Examiner* — Laura M Lee
(74) *Attorney, Agent, or Firm* — Olive Law Group, PLLC

(57) ABSTRACT

A shaver head assembly includes a shaver screen provided with outer fixed blades along an edge, an annular wall, and a blade holder that are coaxially provided. An outer peripheral entry groove is formed between adjacent outer fixed blades. The blade holder has outer movable blades. The outer movable blades and the outer fixed blades cooperate to cut the hairs. An annular collecting groove is formed between the edges of the shaver screen and the annular wall at an end approaching skins. The shaver head assembly further includes guide comb teeth provided on a periphery of the annular wall; the guide comb teeth extend substantially along an axial direction of the shaver screen. Each guide
(Continued)

comb tooth has a tooth body for combing and shunting the hairs; a shunt channel is formed between adjacent guide comb teeth.

8 Claims, 5 Drawing Sheets

(58) Field of Classification Search
USPC .................................. 30/34.2, 43.6; D28/50
See application file for complete search history.

(56) References Cited

U.S. PATENT DOCUMENTS

| | | | | |
|---|---|---|---|---|
| 6,317,983 | B1 * | 11/2001 | Kakimoto | B26B 19/145<br>30/34.2 |
| 6,938,344 | B2 * | 9/2005 | Zuidervaart | B26B 19/14<br>30/34.2 |
| 8,601,695 | B2 * | 12/2013 | Hamburg | B26B 21/4018<br>30/34.2 |
| 9,821,478 | B2 * | 11/2017 | Kleine Doepke | B26B 19/143 |
| 10,987,819 | B2 * | 4/2021 | Huai | B26B 19/14 |
| D925,124 | S * | 7/2021 | Huang | D28/50 |
| 11,285,627 | B2 * | 3/2022 | Veenstra | B26B 19/141 |
| D965,893 | S * | 10/2022 | Jiang | D28/50 |
| 11,772,289 | B2 * | 10/2023 | Paauw | B26B 19/20<br>30/34.2 |
| 2002/0092173 | A1 * | 7/2002 | Zuidervaart | B26B 19/143<br>30/34.2 |
| 2010/0139098 | A1 * | 6/2010 | Kuijper | B26B 19/143<br>30/539 |
| 2018/0161996 | A1 * | 6/2018 | Julemont | B26B 19/14 |
| 2019/0366568 | A1 * | 12/2019 | Huai | B26B 19/14 |

FOREIGN PATENT DOCUMENTS

| | | | | | |
|---|---|---|---|---|---|
| CN | 107735230 | A | | 2/2018 | |
| CN | 109571554 | A | * | 4/2019 | B26B 19/14 |
| CN | 111673801 | A | | 9/2020 | |
| CN | 112140149 | A | | 12/2020 | |
| CN | 113183185 | A | | 7/2021 | |
| CN | 215968887 | U | * | 3/2022 | |
| CN | 216266157 | U | * | 4/2022 | |
| GB | 2160462 | A | | 12/1985 | |

* cited by examiner

SHAVER HEAD ASSEMBLY AND SHAVER

CROSS REFERENCE TO RELATED APPLICATIONS

This is a 371 application that claims priority to PCT International Patent Application No. PCT/CN2021/123153, filed Oct. 12, 2021, which claims priority to Chinese Patent Application Nos. 202120844151.0 and 202110440325.1, both filed Apr. 23, 2021; the disclosures of which are incorporated herein by reference in their entireties.

TECHNICAL FIELD

The present disclosure relates to a shaver head assembly and a shaver, and mainly relates to a technical field of shaving appliances.

BACKGROUND

At present, the appliances for shaving hair (including beard and body hair) can be divided into manual and electric types according to the power, and electric type can be roughly divided into two types: rotary and reciprocating types according to the movement mode. The rotary type is basically the same in structure, whether it is single-head or multi-head. By setting the movable blades on the blade holder, the rotation of the blade holder matches the fixed blades on the shaver screen, and will cut and shave the hairs entering the shaver screen. The hair feeding amount of the shaver screen is an important indicator to measure the efficiency of hair shaving.

For example, in prior art, the patent application with the Publication No. CN112140149A discloses a shaver head assembly of an electric shaver, including a net cover and a blade holder. Wherein the net cover includes a support ring, an outer blade screen and an inner blade screen. There are outer blades on the blade holder corresponding to the position of the outer blade screen, and inner blades on the blade holder corresponding to the position of the inner blade screen. The outer blades and the outer blade screen can cooperate with each other for cutting, the inner blades and the inner blade screen can cooperate with each other for cutting; the inner ring of the outer blade screen is connected with the outer ring of the inner blade screen. Between the outer ring of the outer blade screen and the support ring, several connecting pieces are provided, hollow parts are formed at intervals between adjacent connecting pieces. The outer blade screen is surrounded by a number of serrations in a ring shape, and each serration is located on the same plane. The thickness of the outer blade screen is greater than the thickness of the inner blade screen, and the outermost end of the outer blade is located on the inner side of the serrated tooth tips of the outer blade screen. When in use, the outer blade screen surrounded by serrations can introduce the excessively long hair into the hollow part between the adjacent connecting pieces, such that the excessively long hair can be cut into the net cover, and there will be no jamming and pulling phenomenon, and the comfort is strong. In the second trimming, the inner blade screen and inner blades can be used for fine trimming, with a better trimming effect.

SUMMARY

Technical Problem

Although the shaver head assembly improves the amount of hair feeding by setting the hollow part, and has a better coping effect on long hair, it still has defects:

First of all, the outer blade screen and inner blade screen are approaching the skins when in use, especially the sharp serrations on the outer blade screen may cause damage to the skins, especially in order to shave cleanly, the shaver head assembly is pressed on the skin with force, the damage cause by the serrations to the skin will be increased, causing the skin to appear red and swollen. In addition, if the skin is relatively wrinkled, the serrations are very easy to scratch or even cut the skin and cause bleeding during the shaving process.

Secondly, when the hair is soft, curly or entangled with each other, the hair will be pressed on the skin and cannot stand up. Even if the hollow parts are provided, the hair still cannot enter the outer blade net or the inner blade net, and it needs to be repeated many times to have them shaved clean, resulting in lower efficiency.

Technical Solutions

The technical problem to be solved by the present disclosure is to provide a shaver head assembly and a shaver, such that the shaving efficiency can be improved and the skin can be protected.

The present disclosure is achieved through the following technical solutions.

A shaver head assembly includes a shaver screen, an annular wall, and a blade holder that are coaxially provided; the shaver screen is provided with a plurality of outer fixed blades with jagged shapes along an edge; between adjacent outer fixed blades, an outer peripheral entry groove for hairs to enter in a radial direction is formed; the blade holder has a plurality of outer movable blades, when the blade holder rotates around its axis, the plurality of outer movable blades and the plurality of outer fixed blades cooperate to cut the hairs; the annular wall and the shaver screen are integrally connected and in an angled relationship; an annular collecting groove is formed between the edge of the shaver screen and an edge of the annular wall at an end approaching skins, and configured for collecting the hairs and making them easier to enter the outer peripheral entry groove; the outer peripheral entry groove is connected with the annular collecting groove at an angle to provide a three-dimensional space for a collection and entry of the hairs to be cut;

the shaver head assembly further comprises a plurality of guide comb teeth provided on a periphery of the annular wall; the plurality of guide comb teeth extend substantially along an axial direction of the shaver screen, each of the plurality of guide comb teeth has an end having a highest position not lower than a top surface of the shaver screen, and configured to be supported on the skins such that opportunities of the edge of the shaver screen contacting the skins are reduced; the plurality of guide comb teeth define a hair shaving area; the each of the plurality of guide comb teeth has a tooth body configured for combing and shunting the hairs; a shunt channel is formed between adjacent guide comb teeth for the hairs to enter the hair shaving area.

In one embodiment, the shaver head assembly further comprises a shaver head seat coaxial with the shaver screen and having a cylindrical shape, and the shaver head seat is open at both ends; the each of the plurality of guide comb teeth has a root implanted in an edge of the shaver head seat at one end approaching the skins; the annular wall is slidably inserted into a port of the shaver head seat approaching the skins; the skins and the hairs on the skins are capable to press against the hair on the shaver screen, and push the shaver screen and the annular wall to slide to contract inside the shaver head seat.

In one embodiment, the shaver head seat is further provided with an elastic reset structure, for driving the shaver screen, the annular wall, and the blade holder to slide to reset.

In one embodiment, the shaver head seat is formed with a first stop point and a second stop point along the axial direction, each of the shaver screen and the annular wall has a sliding range limited between the first stop point and the second stop point.

In one embodiment, the shaver screen is provided with a plurality of inner fixed blades provided along an axis, and between adjacent inner fixed blades, an inner peripheral entry groove for hairs to enter in the axial direction is formed; the blade holder has a plurality of inner movable blades; and when the blade holder rotates around its axis, the plurality of inner movable blades and the plurality of inner fixed blades cooperates to cut the hairs.

In one embodiment, the outer peripheral entry groove has an outward extending direction inclined to a radial direction of the shaver screen, with an inclined direction opposite to a rotating direction of the blade holder; the inner peripheral entry groove has an outward extending direction inclined to the radial direction of the shaver screen, with an inclined direction consistent with the rotating direction of the blade holder.

In one embodiment, the annular collecting groove has a width of 0.2 mm-0.7 mm.

In one embodiment, the each of the plurality of guide comb teeth has an end formed by smoothly closing sides.

In one embodiment, the shunt channel has a bottom having a lowest position not higher than a lowest position of the annular collecting groove.

A shaver comprises the shaver head assembly, a housing, and a motor; the shaver head seat is fixed at one end of the housing, the motor is provided in the housing, and has an output shaft connected with the blade holder through a shaft connection structure in a transmission connection.

Beneficial Effect

Beneficial effects of the present disclosure:

1. The guide comb teeth of the present disclosure are supported on the skin, such that the outer fixed blades at the edge of the shaver screen can reduce the chance of contacting the skin and reduce the damage to the skin.
2. The guide comb teeth of the present disclosure are used to shunt the hair by the tooth bodies, and play a combing function. The hair that is flat on the skin are erected, and enter the hair shaving area through the shunt channel.
3. The guide comb teeth of the present disclosure are matched with the annular collecting groove, such that the amount of hair feeding per unit time or area can be increased, and the length of the cutting hair is significantly longer.
4. The guide comb teeth of the present disclosure can improve skin affinity, and the smooth ends that contact the skin during shaving hair can effectively improve the protective effect on the epidermis.
5. The shaver screen and the annular wall of the present disclosure can be pushed up by the skin and the hair on the skin, and pushed back into the shaver head seat, such that the hair can enter the inner peripheral entry groove for cutting more easily.

BRIEF DESCRIPTION OF DRAWINGS

The preferred embodiments of the present disclosure will be described in detail below through the accompanying drawings to help understand the objectives and advantages of the present disclosure, wherein.

DESCRIPTION OF EMBODIMENTS

Figure 1:
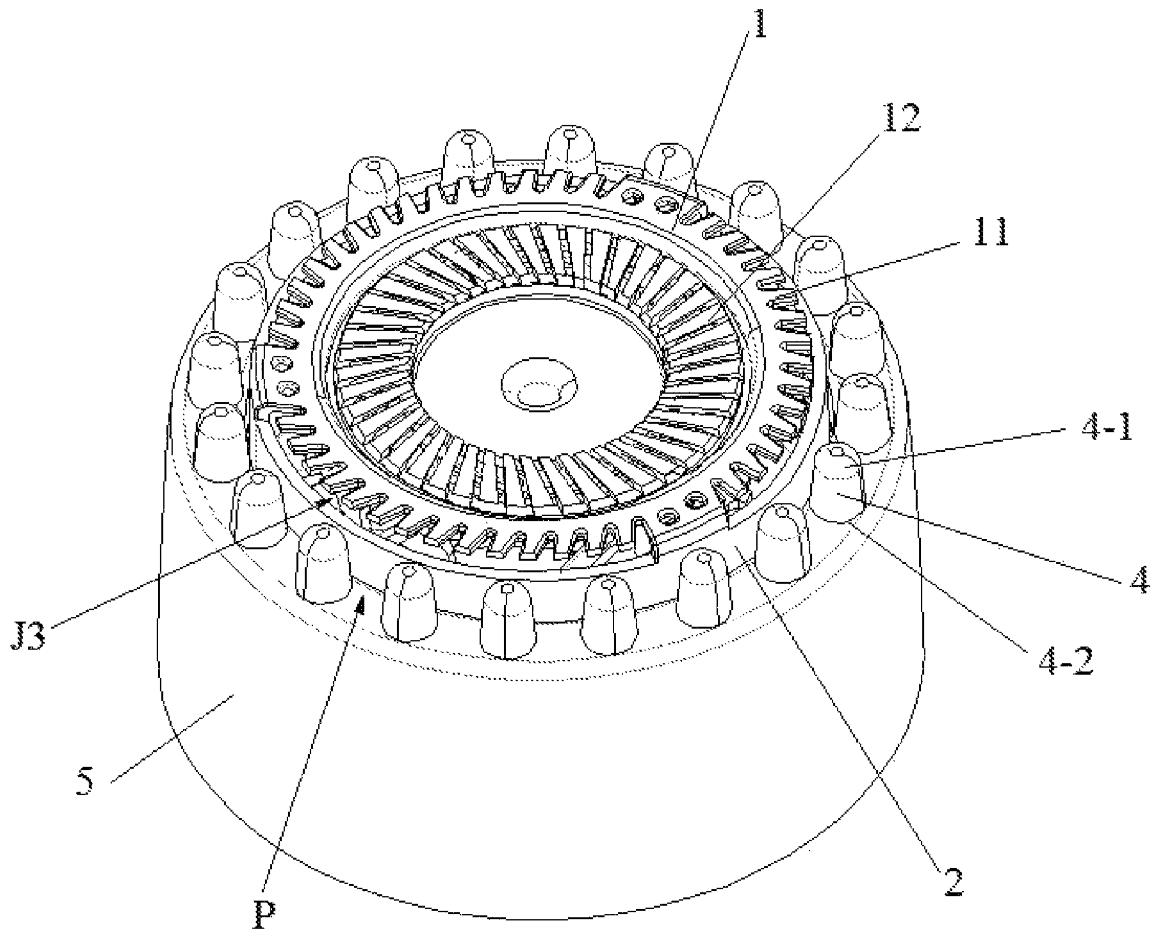
FIG. 1 is a structural schematic diagram illustrating a shaver head assembly according to Example 1.
Figure 2:
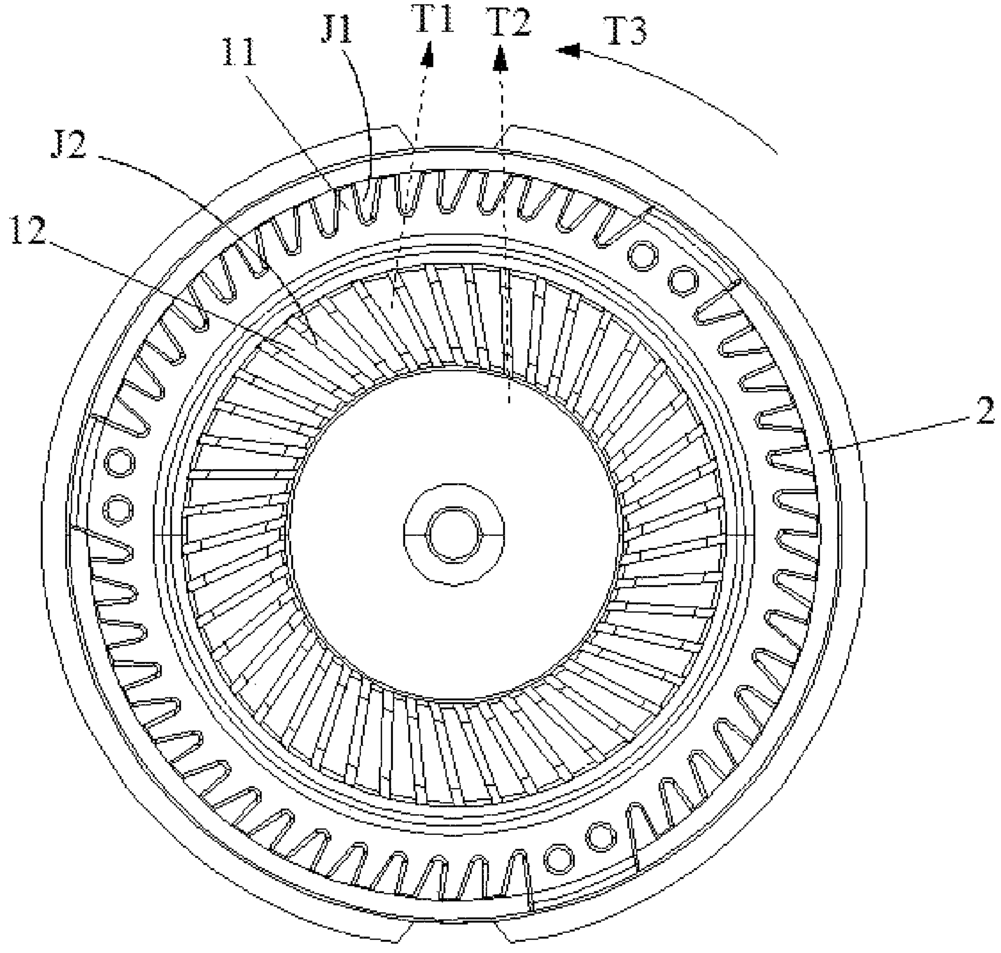
FIG. 2 is a schematic diagram illustrating a top view of shaver screen according to Example 1.
Figure 3:
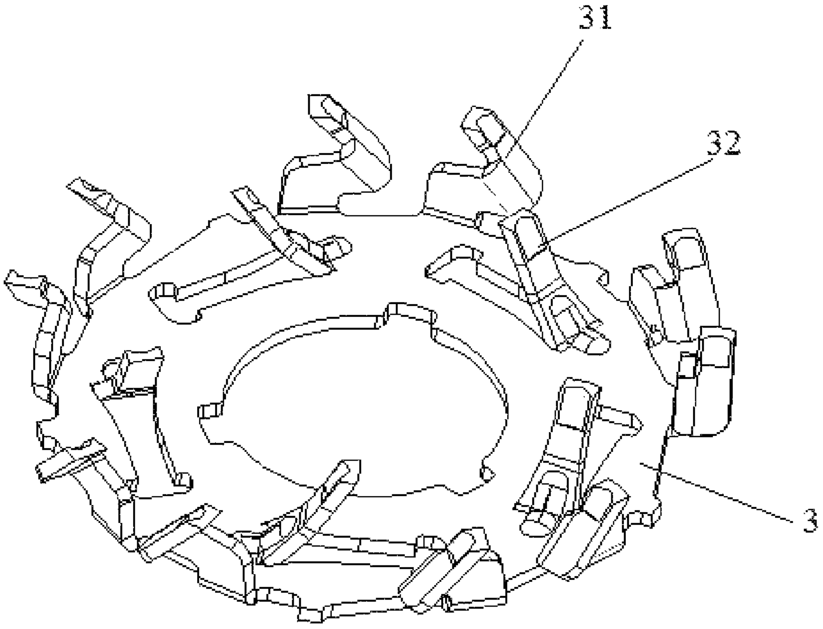
FIG. 3 is a structural schematic diagram illustrating a blade holder according to Example 1.
Figure 4:
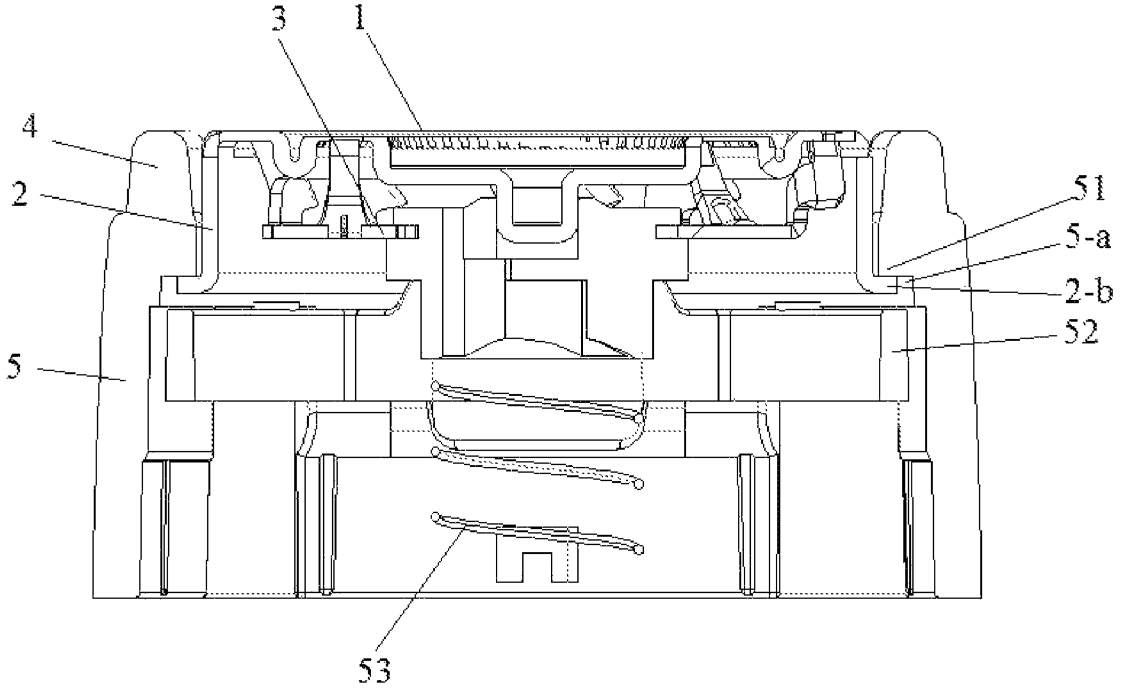
FIG. 4 is a schematic diagram illustrating a cross-sectional view of a shaver head assembly according to Example 1.

The present disclosure will be further described in detail below according to the accompanying drawings and implementation examples.

Orientation terms such as upper, lower, left, right, front, rear, front, back, top, bottom, etc. mentioned or possibly mentioned in the present specification are defined relative to the configurations shown in the drawings, the word “inner” and “outer” refer to directions toward or away from the geometric center of a particular component, respectively, and they are relative concepts, so they may vary accordingly according to their different positions and different states of use. Therefore, these and other terms of orientation should not be construed as limiting.

Example 1

Referring to FIGS. 1 to 4, a shaver head assembly may include a shaver screen 1, an annular wall 2, a blade holder 3, and a plurality of guide comb teeth 4. Among them, the shaver screen 1, the annular wall 2 and the blade holder 3 may be coaxially provided, one end of the annular wall 2 approaching the skins may be integrally connected with the edge of the shaver screen 1 through several connecting pieces spanning them. The annular wall 2 and the shaver screen 1 may be in an angled relationship, such that the shaver screen 1 and the annular wall 2 may constitute a cover-shaped integral structure. In addition, an annular collecting groove J3 may be formed between the edges of the shaver screen 1 and the annular wall 2 at one end approaching the skin, and may be used to collect hairs and make them easier to enter the outer peripheral entry groove J1. The blade holder 3 may be located in the cover-shaped structure formed by the blade screen 1 and the cover body, and its center point may be rotatably connected to the blade screen 1. A plurality of serrated outer fixed blades 11 (outer fixed blades 11 with jagged shapes) may be provided along the edge of the blade screen 1, and an outer peripheral entry groove J1 may be formed between the adjacent outer fixed blades 11 for the hair to enter in the radial direction. The blade screen 1 may be provided with a plurality of inner fixed blades 12 in the form of sheets around its axis, An inner peripheral entry groove J2 for hair to enter in the axial direction may be formed between adjacent inner fixed blades 12. The outer peripheral entry groove J1 may be connected with the annular collecting groove J3 at an angled relationship, such that 3D openings (gaps) for collecting and access for the hair to be cut are provided. The blade holder 3 may have a plurality of outer movable blades 31 and a plurality of inner movable blades 32. When the blade holder 3 rotates around its axis, the plurality of outer movable blades 31 and the plurality of outer fixed blades 11 cooperate to cut the hair; and when the blade holder 3 revolves around its axis, the plurality of inner movable blades 32 cooperate with the plurality of inner fixed blades 12 to cut the hair.

A plurality of guide comb teeth 4 may be provided on the periphery of the annular wall 2 and basically extend along the axial direction of the shaver screen 1. The highest point of its end 4-1 is not lower than the top surface of the shaver screen 1. When using the shaver head assembly to shave hair, the end 4-1 of each guide comb tooth 4 may be supported on the skin, such that the outer fixed blades 11 at the edge of the shaver screen 1 can reduce the chance of contacting the skin. Specifically, when shaving hair on smooth skin, the outer fixed blades 11 can be prevented from contacting the skin. The plurality of guide comb teeth 4 may be supported on the skin to define a circular hair shaving area, and the hair shaving area corresponds to the range covered by the shaver head assembly on the skin. The tooth body of each guide comb tooth 4 may be used for combing and shunting the hair. A shunt channel P may be formed between the adjacent guide comb teeth 4 for the hair to enter the hair shaving area. The lowest point of the bottom of each shunt channel P is not higher than the lowest point of the annular collecting groove J3.

In the shaver head assembly of the present disclosure, the process of shaving hair may be as follows: the plurality of guide comb teeth 4 are supported on the skin and define an annular hair shaving area; as the shaver head assembly slides on the skin, the plurality of guide comb teeth 4 combine the hair such that the hair enters the hair shaving area from the corresponding shunt channel P. The longer hairs may be then collected in the annular collecting groove J3 between the edge of the blade screen 1 and the edge of the annular wall 2, and then enter into different outer peripheral entry grooves J1 from the outside of the blade screen 1 along its radial direction, and can be cut through a cooperation of the outer fixed blades 11 and the outer movable blades 31. The hairs (hairs that are not completely shaved and shorter hairs) located between the surface of the blade screen 1 and the skin enter the inner peripheral entry groove J2 along the axial direction of the blade screen 1, and can be cut or re-cut through the cooperation of the plurality of inner fixed blades 12 and the plurality of inner movable blades 32.

Based on the process of shaving hair, the plurality of guide comb teeth 4, the shunt channel P formed between the adjacent guide comb teeth 4, the annular wall 2, the annular collecting groove J3 between the annular wall 2 and the shaver screen 1 constitute a combined structure with a "fence with a half wall".

Compared with the prior art, the plurality of guide comb teeth 4 are supported on the skin, such that the serrated outer fixed blades 11 on the edge of the shaver screen 1 can reduce the chance of contacting the skin, thereby reducing the skin damage by the outer fixed blades 11. The phenomenon of redness and swelling on the skin can be avoided, and the risk of scratching the skin by the outer fixed blades 11 due to skin wrinkles can also be reduced.

In order to improve the skin-friendly properties of the plurality of guide comb teeth 4, the structure of each guide comb tooth 4 may be provided in a columnar structure, and its end 4-1 may be formed by smoothly closing the sides, basically showing a round head-like structure, such that it may be smoother in contact with the skin and has a protective effect on the skin. When the shaver head assembly of the present disclosure is pressed on the skin with force, the hair shaving area presents an arc surface with an upward bulge in the middle and a downward depression in the periphery. The downward depression in the periphery may be due to the action of the guide comb teeth 4. Due to the skin-friendly nature of the guide comb teeth 4, it will not cause damage to the skin. On the contrary, the arc surface presented in the hair shaving area can have the effect of leveling the wrinkles on the skin, improving the smoothness of the skin and making it easier to shave the hair.

In addition, when contacting the wrinkled skin, the guide comb teeth 4 of the "fence with a half wall" make the skin at the edge of the hair shaving area taut, and there will be no close contact between the hair shaving area and the shaver screen 1. Compared with the prior art, the outer fixed blades 11 push and press the skin such that the entire shaver screen 1 compresses the skin. In the present disclosure, the hair may be more likely to enter the annular collecting groove J3 of the "fence with a half wall", and then enter the outer peripheral entry groove J1 for cutting.

The guide comb teeth 4 of the "fence with a half wall" also have a very important role in combing the hair before entering the hair shaving area, especially for softer, more curly, intertwined hairs, these types of hairs basically are flat on the skin. The combing action of the guide comb teeth 4 can make this type of hair erect and enter the hair shaving area through the shunt channel P, such that it may be easier to be captured and collected by the annular collecting groove J3 and enter the outer peripheral entry groove J1. Therefore, under the actions of the guide comb teeth 4, the annular collecting groove J3, and the outer peripheral entry groove J1, the shaver head assembly of the present disclosure greatly increases the amount of hair feeding per unit time or area, and the length of the cutting hair may be also significantly longer.

The annular collecting groove J3 of the "fence with a half wall" is especially suitable for capturing and collecting long hairs. In theory, the larger the width of the annular collecting groove J3, the stronger the performance of capturing and collecting long hair, and the greater the amount of hair entering. In practical application, the excessively wide annular collecting groove J3 will cause the hair to wrap around the blade holder 3 or the outer fixed blades 11, which will then affect the cutting performance between the shaver screen 1 and the blade holder 3. Therefore, in the present implementation, the width of the annular collecting groove J3 is limited to 0.2 mm-0.7 mm, which can increase the amount of hair feeding on the premise of avoiding the hair wrapping around the blade holder 3.

In addition, the outward extending direction T1 of the outer peripheral entry groove J1 is inclined to the radial direction of the shaver screen 1, and the inclined direction is opposite to the rotating direction T3 of the blade holder 3, such that when the blade holder 3 rotates to drive the outer movable blades 31 cooperate with the outer fixed blades 11 to cut, the hair entering the outer peripheral entry groove J1 is easy to slide out, which improves the hair shaving efficiency of the outer movable blades 31 and the outer fixed blades 11. The outward extending direction of the inner peripheral entry groove J2 is inclined to the radial direction of the blade screen 1, and the inclined direction T2 is consistent with the rotating direction T3 of the blade holder 3. Therefore, when the inner movable blades 32 cooperate with the inner fixed blades 12 for cutting, the hair will be pushed to the end of the inner peripheral entry groove J2 away from the center point of the shaver screen 1, such that the cutting position of the inner movable blades 32 are the part with the fastest linear speed, and the cutting performances of the inner movable blades 32 and the inner fixed blades 12 are improved.

The shaver head assembly may further include a shaver head seat 5 that is coaxially provided with the shaver screen 1. The shaver head seat 5 may be cylindrical and may be open at both ends, and the root 4-2 of the each guide comb tooth 4 may be implanted on the edge of the end of the shaver head seat 5 approaching the skins. The annular wall 2 may be slidably inserted into the port of the shaver head seat 5 approaching the skins.

The end of the shaver head seat 5 approaching the skins may be defined as the head end, and the end away from the skin may be defined as the tail end. The inner wall of the shaver head seat 5 has a circle of step structure 51 near the head end. The shaver head seat 5 may be also provided with a support ring 52 on its inner wall, the support ring 52 may be closer to the tail end of the shaver head seat 5 than the step structure 51. The step structure 51, the support ring 52, and the inner wall of the shaver head seat 5 between them form an annular groove 5-*a*, the outer surface of the annular wall 2 has a circle of flange structure 2-*b* protruding radially. The flange structure 2-*b* is stuck in the annular groove 5-*a*, and can slide in the axial direction. While the step structure 51 and the support ring 52 constitute the first stop point and the second stop point to limit the sliding range along the axial direction of the annular wall 2 and the shaver screen 1.

The restricted axial sliding of the annular wall 2 and the blade screen 1 can form a floating longitudinal space between the blade screen 1 and the skin. The skin and the hair on the skin are supported on the blade screen 1 and can push the blade screen 1 and the annular wall 2 to slide and contract into the shaver head seat 5, such that these hairs can enter the inner peripheral entry groove J2 of the shaver screen 1 in the axial direction, and it may be also easier to make other hairs bounce and enter the inner peripheral entry groove J2. In addition, the shaver head seat 5 may be also provided with an elastic reset structure 53 configured for driving the shaver screen 1 and the annular wall 2 to slide and reset. In the present embodiment, the elastic reset structure 53 may be a compression spring.

Example 2

Figure 5:
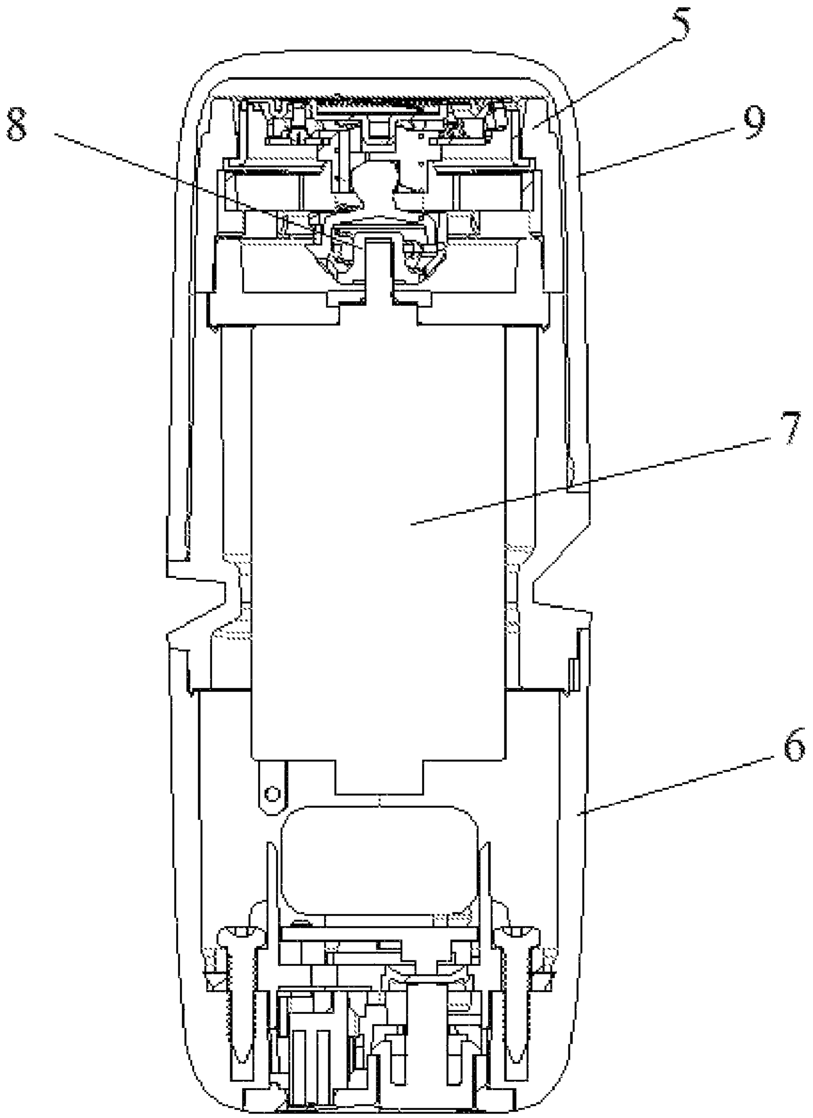
FIG. 5 is a schematic diagram illustrating a cross-sectional view of the shaver according to Example 2.

Referring to FIG. 5, a hair shaver may include the shaver head assembly according to Example 1, a housing 6, and a motor 7. The housing 6 may have a cylindrical structure, the shaver head seat 5 may be fixed at one end of the housing 6, the motor 7 may be provided in the housing, and the output shaft and the blade holder 3 may be connected by a shaft connection structure 8. In addition, a cover 9 may be provided, which can be fastened to the housing to cover the shaver head assembly.

Finally, it should be noted that: the above implementations are only used to illustrate the technical solutions of the present disclosure, but not to limit it. Although the present disclosure has been described in detail with reference to the foregoing implementations, those of ordinary skill in the art should understand: modifications can be still made, or equivalent replacements are made to some of the technical features to the technical solutions described in the foregoing embodiments. While these modifications or replacements do not make the essence of the corresponding technical solutions depart from the scope of the technical solutions according to the embodiments of the present disclosure.

What is claimed is:

1. A shaver head assembly, comprising a shaver screen, an annular wall, and a blade holder that are coaxially provided; the shaver screen is provided with a plurality of outer fixed blades with jagged shapes along an edge of the shaver screen; an outer peripheral entry groove is formed between adjacent outer fixed blades that allows for hairs to enter in a radial direction; the blade holder has a plurality of outer movable blades, when the blade holder rotates around an axis of the blade holder, the plurality of outer movable blades and the plurality of outer fixed blades cooperate to cut the hairs; the annular wall and the shaver screen are integrally connected and in an angled relationship; an annular collecting groove is formed between the edge of the shaver screen and an edge of the annular wall at an end adjacent to skins, and configured for collecting the hairs and making the hairs enter each outer peripheral entry groove; each outer peripheral entry groove is connected with the annular collecting groove at an angle to provide a three-dimensional space for a collection and entry of the hairs to be cut;

wherein:

the shaver head assembly further comprises a plurality of guide comb teeth provided on a periphery of the annular wall; the plurality of guide comb teeth extend substantially along an axial direction of the shaver screen, each of the plurality of guide comb teeth has an end having a highest position not lower than a top surface of the shaver screen, and configured to be supported on the skins; the plurality of guide comb teeth define a hair shaving area; each of the plurality of guide comb teeth has a tooth body configured for combing and shunting the hairs; a shunt channel is formed between adjacent guide comb teeth for the hairs to enter the hair shaving area;

the shaver screen is provided with a plurality of inner fixed blades provided along an axis of the shaver screen, and an inner peripheral entry groove is formed between adjacent inner fixed blades that allows for hairs to enter in the axial direction; the blade holder has a plurality of inner movable blades; and when the blade holder rotates around the axis of the blade holder, the plurality of inner movable blades and the plurality of inner fixed blades cooperates to cut the hairs;

each outer peripheral entry groove has an outward extending direction inclined to a radial direction of the shaver screen, with an inclined direction opposite to a rotating direction of the blade holder; the inner peripheral entry groove has an outward extending direction inclined to the radial direction of the shaver screen, with an inclined direction consistent with the rotating direction of the blade holder.

2. The shaver head assembly according to claim 1, wherein the shaver head assembly further comprises a shaver head seat coaxial with the shaver screen and having a cylindrical shape, and the shaver head seat is open at both ends; each of the plurality of guide comb teeth has a root implanted in an edge of the shaver head seat at one end adjacent to the skins; the annular wall is slidably inserted into a port of the shaver head seat adjacent to the skins; the shaver screen and the annular wall are capable to be contracted to slide inside the shaver head seat.

3. The shaver head assembly according to claim 2, wherein the shaver head seat is further provided with an elastic reset structure, for driving the shaver screen, the annular wall, and the blade holder to slide to reset.

4. The shaver head assembly according to claim 3, wherein the shaver head seat is formed with a first stop point and a second stop point along the axial direction, each of the shaver screen and the annular wall has a sliding range limited between the first stop point and the second stop point.

5. The shaver head assembly according to claim 1, wherein, the annular collecting groove has a width of 0.2 mm-0.7 mm.

6. The shaver head assembly according to claim 1, wherein each of the plurality of guide comb teeth has an end formed by smoothly closing sides.

7. The shaver head assembly according to claim 1, wherein, the shunt channel has a bottom having a lowest position not higher than a lowest position of the annular collecting groove.

8. A shaver, comprising the shaver head assembly according to claim 1, a housing, and a motor; wherein a shaver head seat is fixed at one end of the housing, the motor is provided in the housing, and has an output shaft connected with the blade holder through a shaft connection structure in a transmission connection.

* * * * *